United States Patent
Rahm et al.

(10) Patent No.: US 12,249,798 B2
(45) Date of Patent: Mar. 11, 2025

(54) NON-SHORTING CABLE CORING TOOL

(71) Applicant: CommScope Technologies LLC, Hickory, NC (US)

(72) Inventors: James K. Rahm, Allentown, PA (US); Jared M. Gordon, Chalfont, PA (US); Robert F. Giordano, Branchburg, NJ (US); Zhijian Sun, Avon, CT (US); Zoran Maricevic, West Hartford, CT (US); Michael P. Galecki, Cheshire, CT (US); Eric J. Cormier, Bristol, CT (US); Kevin P. Orazietti, Chester, CT (US)

(73) Assignee: CommScope Technologies LLC, Hickory, NC (US)

( * ) Notice: Subject to any disclaimer, the term of this patent is extended or adjusted under 35 U.S.C. 154(b) by 962 days.

(21) Appl. No.: 17/139,895

(22) Filed: Dec. 31, 2020

(65) Prior Publication Data
US 2021/0210917 A1    Jul. 8, 2021

Related U.S. Application Data

(60) Provisional application No. 62/956,808, filed on Jan. 3, 2020.

(51) Int. Cl.
*H02G 1/12* (2006.01)
*H01R 9/05* (2006.01)
*H01R 43/01* (2006.01)

(52) U.S. Cl.
CPC ......... *H01R 43/015* (2013.01); *H01R 9/0509* (2013.01); *H01R 9/0524* (2013.01); *H02G 1/12* (2013.01)

(58) Field of Classification Search
CPC ...... H01R 24/56; H01R 43/015; H01R 43/05; H01R 43/28; H01R 9/05; H01R 9/0509; H01R 9/0524; H02G 1/12; H02G 1/1221; H02G 1/1224; H02G 1/1226; H02G 1/1265; E21B 10/26; E21B 10/36; E21B 10/44; E21B 10/48; E21B 10/62; B23B 2240/16; B23B 51/00; B23B 51/02; B23B 51/08; B23B 51/10; B25B 21/00; B25B 21/007;
(Continued)

(56) References Cited

U.S. PATENT DOCUMENTS 2,306,598 A * 12/1942 Ellson .................. E21B 17/046
                                                        175/219
4,345,375 A    8/1982 Hayward
(Continued)

FOREIGN PATENT DOCUMENTS

WO    WO 2010/031021 A2    3/2010

*Primary Examiner* — Robert J Scruggs
(74) *Attorney, Agent, or Firm* — Muncy, Geissler, Olds & Lowe, P.C.

(57) ABSTRACT

A coring tool for a coaxial cable has a tool holder and cutter bit mounted to the tool holder. The cutter bit is constructed from a conductive metal or alloy which is durable for rotatably drilling out and removing a dielectric core surrounding a central conductor of the coaxial cable, as the central conductor is preserved by passing into a central bore formed in the cutter bit. The cutter bit also includes a non-conductive sleeve or coating which prevents the cutter bit from electrically interconnecting, e.g., shorting, the central conductor to an outer conductor of the coaxial cable.

20 Claims, 10 Drawing Sheets

(58) Field of Classification Search
CPC . B25B 23/0007; B23P 15/32; H01B 11/1834; H01B 13/016; B23C 5/10
See application file for complete search history.

(56) References Cited

U.S. PATENT DOCUMENTS

| | | | |
|---|---|---|---|
| 4,459,881 A | | 7/1984 | Hughes, Jr. |
| 4,729,268 A | | 3/1988 | Morrow |
| 5,749,270 A | * | 5/1998 | Bourbeau ............ H02G 1/1226 29/566.4 |
| 7,022,918 B2 | | 4/2006 | Gialenios et al. |
| 7,694,420 B2 | * | 4/2010 | Ehret ................... H02G 1/1224 30/90.1 |
| 7,972,176 B2 | | 7/2011 | Burris et al. |
| 8,177,582 B2 | | 5/2012 | Amidon |
| 2005/0115074 A1 | | 6/2005 | Gialenios et al. |
| 2006/0127847 A1 | * | 6/2006 | Danger ................. B23B 51/02 433/165 |
| 2010/0064522 A1 | | 3/2010 | Vaccaro |

* cited by examiner

NON-SHORTING CABLE CORING TOOL

CROSS REFERENCE TO RELATED APPLICATIONS

This application claims the benefit of U.S. Provisional Application Ser. No. 62/956,808, filed Jan. 3, 2020, which is herein incorporated by reference.

BACKGROUND OF THE INVENTION

1. Field of the Invention

The present invention relates to a coaxial cable coring tool. More particularly, the present invention relates to a coring tool which is durable enough to remain sharp while performing many cable end preparations for the attachment of coaxial cable connectors, and which prevents, or reduces the duration time of an electrical shorting event, between a central conductor and an outer conductor of the coaxial cable while removing a dielectric core therebetween.

2. Description of the Related Art

Cable Television (CATV) services provide content to large groups of subscribers from a central delivery unit, called a "head end," which distributes channels of content to its subscribers from this central unit through an access network comprising a multitude of intermediate nodes. Modern CATV service networks, however, not only provide media content such as television channels and music channels to a customer, but also provide a host of digital communication services such as Internet Service, Video-on-Demand, telephone service such as Voice over Internet Protocol (VoIP), home automation/security, and so forth. These digital communication services, in turn, require not only communication in a downstream direction from the head end through the network to a subscriber, but also require communication in an upstream direction from a subscriber and to the content provider through the network.

To this end, CATV head ends have historically included a separate Cable Modem Termination System (CMTS), used to provide high speed data services, such as video, cable Internet, VoIP, etc. to cable subscribers. Typically, a CMTS will include both Ethernet interfaces (or other more traditional high-speed data interfaces) as well as RF interfaces so that traffic coming from the Internet can be routed (or bridged) through the Ethernet interface, through the CMTS, and then onto the optical RF interfaces that are connected to the cable company's hybrid fiber coax (HFC) system. Downstream traffic is delivered from the CMTS to a cable modem and/or set top box in a subscriber's home, while upstream traffic is delivered from a cable modem and/or set top box in a subscriber's home back to the CMTS. Many modern CATV systems have combined the functionality of the CMTS with the video delivery system (EdgeQAM) in a single platform called the Converged Cable Access Platform (CCAP). Still other modern CATV systems called Remote PHY (or R-PHY) relocate the physical layer (PHY) of a traditional CCAP by pushing it to the network's fiber nodes. Thus, while the core in the CCAP performs the higher layer processing, the R-PHY device in the node converts the downstream data sent by the core from digital-to-analog to be transmitted on radio frequency, and converts the upstream RF data sent by cable modems and/or set top boxes from analog-to-digital format to be transmitted optically to the core.

Regardless of which such architectures were employed, historical implementations of CATV systems bifurcated available bandwidth into upstream and downstream transmissions, i.e. data was only transmitted in one direction across any part of the spectrum. For example, early iterations of the Data Over Cable Service Interface Specification (DOCSIS) specified assigned upstream transmissions to a frequency spectrum between 5 MHz and 42 MHz and assigned downstream transmissions to a frequency spectrum between 50 MHz and 750 MHz. Though later iterations of the DOCSIS standard expanded the width of the spectrum reserved for each of the upstream and downstream transmission paths, the spectrum assigned to each respective direction did not overlap.

Referring to FIG. 1, a CATV distribution network may include a headend 100. The headend 100 provides data to one or more associated distribution hubs 110 that normally provide digital output signals. The digital output signals from the distribution hubs 110 may be routed by a transmitter 120 and transmitted along a respective optical fiber 130, which is often on the order of 5-40 kilometres in length. The digital output signals from the distribution hubs 110 are received by a respective optical node 140. The optical node 140 converts the received digital signal from the optical fiber 130 to a radio frequency (RF) signal, typically in the form of quadrature amplitude modulation (QAM), and provides the RF signal to consumer premises equipment, such as a respective set top box and/or a respective modem 150 (including other such devices).

Typically, the output of the optical node 140 provides a RF signal to trunk lines in the form of hardline coaxial cables 160. The coaxial cables 160 may be connected to line RF amplifiers 170 (which are typically active and require power) to boost the signals carried on the coaxial cables 160. Each optical node 140 may provide communication signals to coaxial cables 160 to supply between 500 and 2,000 consumers. Each optical node 140 may also supply power to the coaxial cables 160 to power the RF amplifiers 170 which amplify the upstream and/or downstream communication signals carried by the coaxial cables 160.

During construction, repairs, and upgrading of the coaxial portions of the network, the coaxial cables 160 may be repaired and replaced. Also, additional coaxial cables 160 may be inserted into the network for new customers. For example, a coaxial cable 160 is sized to length and extended between a pair of ports within the network, e.g., between ports of RF amplifiers 170. After sizing and extending the coaxial cable 160, the ends of the coaxial cable 160 are prepared as illustrated in FIG. 2, so that each end of the cable 160 may receive a typical, coaxial cable connector 210, such as illustrated in FIG. 3. An example of the typical coaxial connector 210 may be found in U.S. Pat. No. 7,972,176, which is herein incorporated by reference.

One embodiment of the component parts of the typical coaxial cable 160 of the "hardline" type is illustrated in FIG. 4. The coaxial cable 160 includes a cylindrical tubular outer conductor 234 containing a nonconductive dielectric core 232. The dielectric core 232 coaxially surrounds an axially elongated conductive central conductor 230. The dielectric core 232 is preferably a foamed polyethylene (PE) material, which is an insulation material to reduce signal losses while at the same time creating mechanical separation and electrical isolation between the central conductor 230 and the outer conductor 234.

In addition to RF communication signals, the central conductor 230 and the outer conductor 234 carry an AC power signal, e.g., a sawtooth 60 volt or 90 volt signal to power the RF amplifiers 170, as well as potentially other devices connected to the coaxial cable 160. It is noted that for both RF communication signal transmission and the transmission of AC power, an outer surface of the central conductor 230 is physically separated and electrically isolated from an inner surface of the outer conductor 234 by the dielectric core 232. Further, an outer surface the outer conductor 234 may be protected from the environment by one or more external layers, such as an extruded, outer jacket 318.

With Reference to FIGS. 5 and 6, an intermediate step to prepare the cable end, as shown in FIG. 2, will be explained. Initially, a first end 316 of the coaxial cable 160 is cut flush, so as to resemble the cross-sectional view of FIG. 6. Next, a stripper tool is used to remove a section of the jacket 318 to expose the underlying outer conductor 234. Finally, a coring tool is used to drill out, i.e., remove, a section of the dielectric core 232, so that an empty section 314 exists within the outer conductor 234 and surrounds the central conductor 230, as shown in FIG. 2. The empty section 314 accepts a portion of the connector 210, when the connector 210 is attached to the end of the coaxial cable 160.

Coring tools are generally known in the art. For example, see U.S. Pat. Nos. 4,345,375; 4,459,881; 4,729,268; 5,749,270; 7,694,420; and 8,177,582, as well as US Published Applications 2005/0115074 and 2010/0064522, each of which is herein incorporated by reference.

SUMMARY OF THE INVENTION

As previously mentioned, the CATV network is subjected to ongoing construction, repairs, and upgrading. The coaxial cables 160 are constantly being replaced, rerouted, and/or added for new customers. The coaxial cables 160 carry an AC power signal for powering the RF amplifiers 170 within the network. The power on the coaxail cables 160 is not turned off when repairs and upgrades are made, because to do so would disrupt the service to existing customers. Rather, the technician works on the coaxial cables 160, while the coaxial cables 160 are "hot," e.g., the communication signals and the AC power are present.

The common coring tools of the industry having a cutter bit formed of a metal or an alloy. The cutter bit is very durable and can reliably drill out the dielectric core 232 at the end of the coaxial cable 160 hundreds or thousands of times with little to no maintenance being performed on the coring tool. Unfortunately, the cutter bit of the coring tool is also conductive. As the dielectric core 232 is being drilled out of the cut end of the coaxial cable 160, the cutter bit will intermittently create an electrical short circuit between the outer conductor 234 and portions of the outside surface of the central conductor 230.

A coaxial CATV network tends to have 10-15 amps of current flowing through it, so the result of intermittent electrically interconnecting of the central conductor 230 to the outer conductor sheath 234 can possibly create arc damage to portions of the coaxial cable 160 where the connector 210 is installed, and possibly damage blades of the coring tool. More importantly, the shorting causes sudden transients in the alternating current voltage levels between +/−60 volts (for example) and 0 volts or between +/−90 volts and 0 volts. The equipment, such as the optical nodes 140 and the RF amplifiers 170, are designed to accommodate "brief" transients in the alternating current voltage levels. During such accommodation, a short duration of video may be lost in transmission to the customers, which doesn't tend to be excessively undesirable for the customer because of its short duration, e.g., less than a second. During such accommodation a limited amount of online data may also be lost in transmission, which doesn't tend to be excessively undesirable for the customer because the receiving device can normally automatically determine some data is not present and automatically request the data to be subsequently resent.

However, in some cases the shorting transients are excessive in duration which causes the optical nodes 140 and/or the RF amplifiers 170 to go off-line and pass into a reset mode. The optical nodes 140 and RF amplifiers 170 are designed to automatically recover at a later time and automatically return to proper operation. During the time required for a reset and restart operation, the interruption in the video streams and the loss of data becomes sufficient to disrupt the customer experience.

One solution would be to use a coring tool having a cutter bit formed of a non-conductive material, like plastic or ceramic. See U.S. Pat. No. 7,694,420. However, such cutter bits are not as durable. The drilling out of the dielectric core 232 and intermittent contacting of the cuter bit with the central conductor 230 and outer conductor 234 tends to wear the cutter bit. As such, the coring tool would require more frequent service or replacement.

It is an object of the present invention to provide a coring tool for a coaxial cable wherein, the cutter bit is constructed from a conductive metal or alloy which is durable for rotatably drilling out and removing a dielectric core 232 surrounding a central conductor 230 of the coaxial cable 160, wherein the cutter bit also includes a non-conductive sleeve or coating which prevents the cutter bit from electrically interconnecting, e.g., shorting the central conductor 230 to the outer conductor 234 of the coaxial cable 160.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION OF EMBODIMENTS OF THE INVENTION

Figure 1:
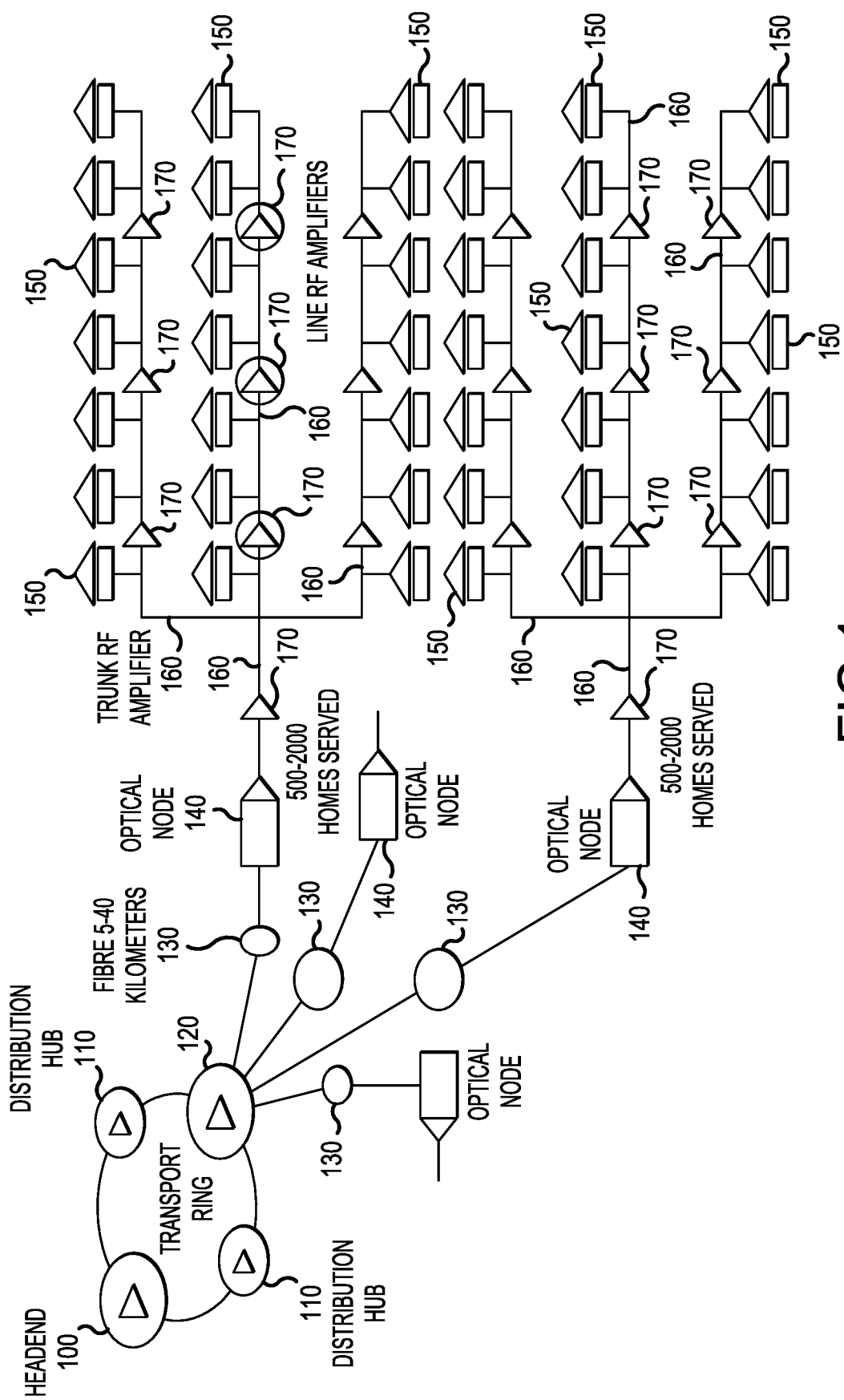
FIG. 1 illustrates a cable distribution network, in accordance with the prior art.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

Figure 7:
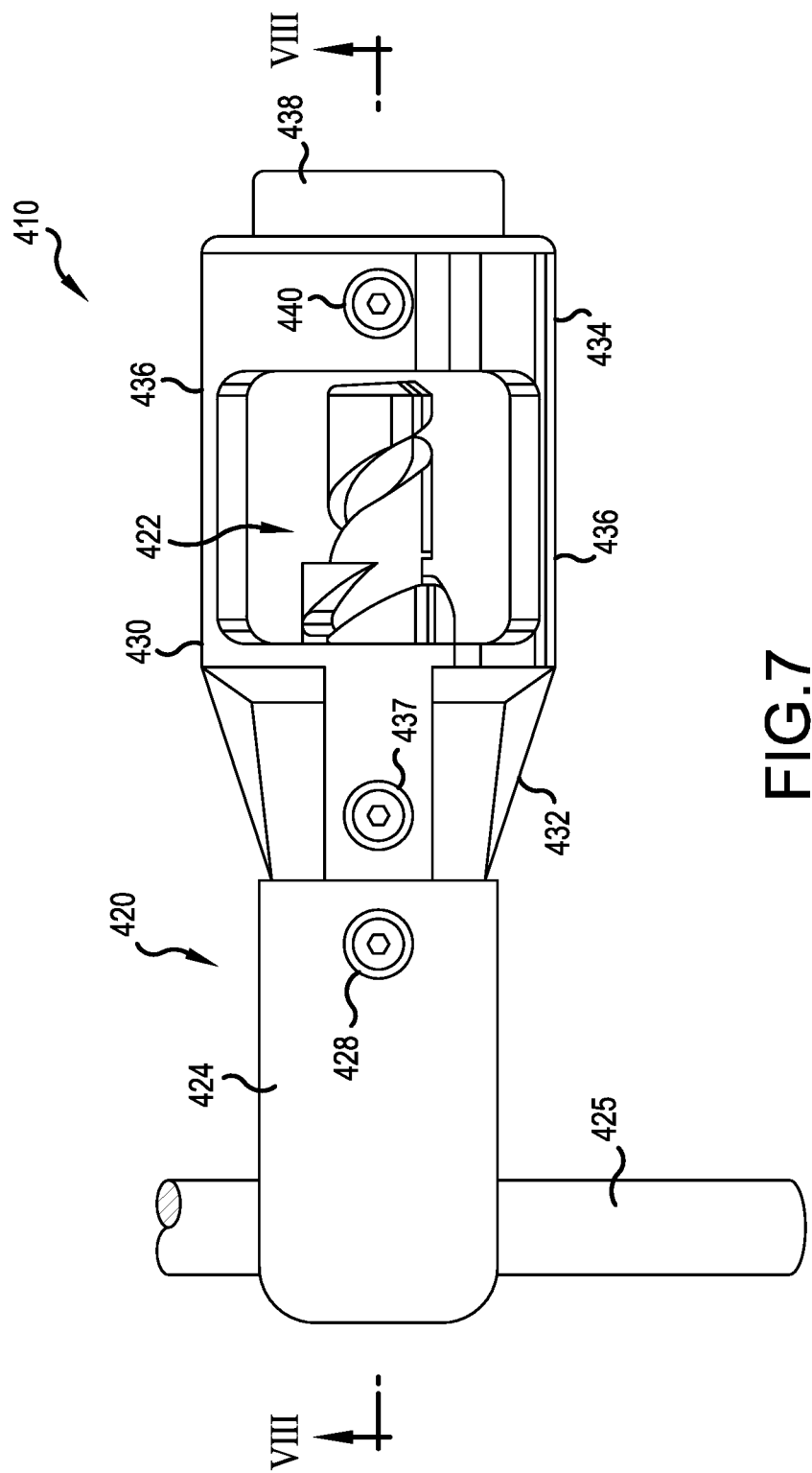
FIG. 7 is a top view of a coring tool, in accordance with the present invention.
Figure 8:
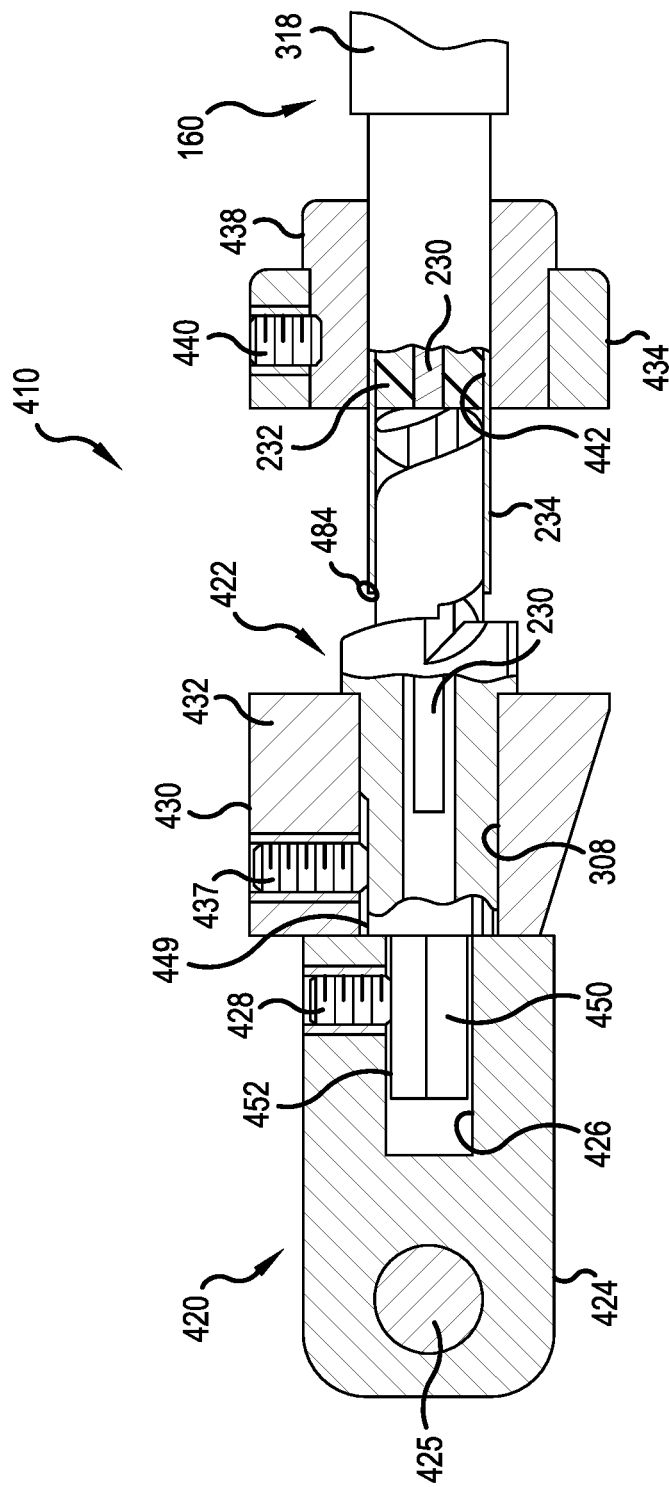
FIG. 8 is a cross-sectional view taken along line VIII-VIII in FIG. 7.
Figure 9:
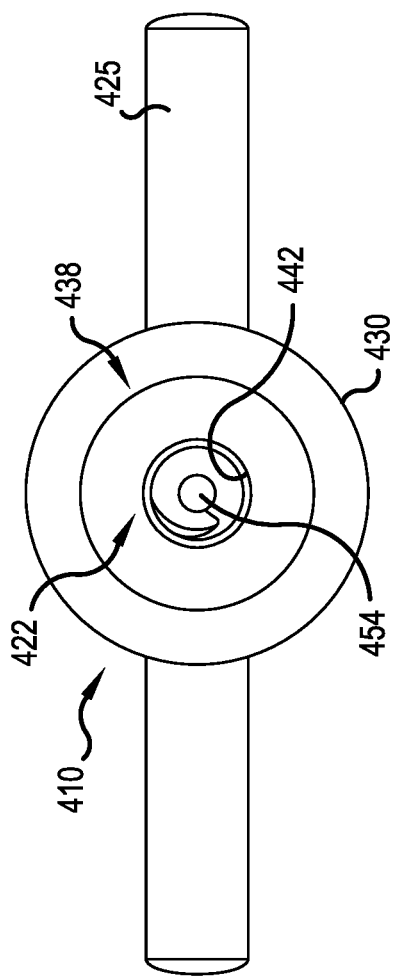
FIG. 9 is a forward end view of the coring tool of FIG. 7.
Figure 10:
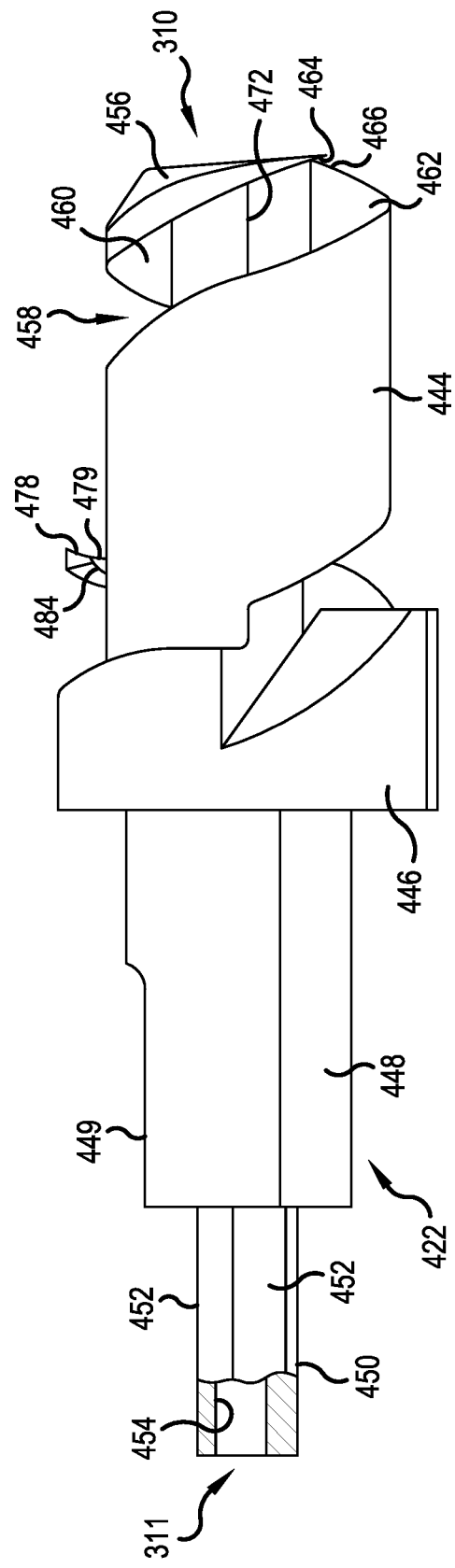
FIG. 10 is a side view of a cutter bit of the coring tool of FIGS. 7-9.

FIG. 7 is a top view of a coring tool 410 for a coaxial cable 160, in accordance with the present invention. FIG. 8 is a cross-sectional view taken along line VIII-VIII in FIG. 7. FIG. 9 is a forward end view of the coring tool of FIG. 7. While, FIG. 10 is a side view of a cutter bit of the coring tool of FIGS. 7-9.

Referring to FIGS. 7-10, the coring tool 410 may include a tool holder 420, and an axially elongated cutting tool or cutter bit 422 mounted to the tool holder 420 projecting axially outwardly from it. The tool holder 420 may be constructed from any suitable material, such as a durable high impact plastic material, e.g., ultem, acetal, phenolic. The tool holder 420 includes a generally T-shaped handle with a handle base 424 and attached rod 425. The rod 425 is used to manually rotate the tool handle 420.

The handle base 424 has a forwardly open handle bore 426 for receiving a rear shank 450 of the cutter bit 422. A set screw 428 carried by the handle base 424 engages a flat surface 452 on the rear shank 450 of the cutter bit 422. The set screw 428 is threaded into the handle base 424 to releasably secure the cutter bit 422 within the handle bore 426 of the handle base 424.

The tool holder 420 may optionally include an integral body part 430. However, the body part 430 may be formed separately from the tool holder 420. The body part 430 includes a rear portion 432 and a forward portion 434 integrally connected by a pair of diametrically opposed side members 436. The body part 430 carries a set screw 437 which engages another shank part 449 of the cutter bit 422 to releasably secure the body part 430 in fixed position on and relative to the cutter bit 422.

A guide member, such as a generally cylindrical tubular alignment bushing 438, maintains an end portion of the coaxial cable 160 in coaxially alignment with the cutter bit 422 during the cable coring operation. The alignment bushing 438 may be releasably secured in the forward portion 434 by a set screw 440 threadably engaged within the forward portion 434 and bearing upon the alignment bushing 438. The alignment bushing 438 has a cylindrical bore 442 extending coaxially through it, the diameter of the bore 442 being substantially equal to the outside diameter of the outer conductor 234 to receive the outer conductor 234 therein and allow for free rotation of the outer conductor 234 within the alignment brushing 438.

The cutter bit 422 is formed as an axially elongated generally cylindrically stepped member. The cutter bit 422 has a cylindrical coring portion 444 at its forward end 310 and a diametrically enlarged stripping portion 446 immediately rearward of the coring portion 444. A generally cylindrical first shank 448 extends coaxially rearwardly from the stripping portion 446 and has an outside diameter substantially equal to the inside diameter of a bore 308 in the rear portion 432 in which it is received. A single flat 449 is formed on the first shank 448 and provides a seating surface for the set screw 437 which secures the rear portion 432 and hence the body part 430 in a non-rotatable manner to the cutter bit 422.

The rear shank 450 has a further reduced diameter as compared to the first shank 448 and projects coaxially rearwardly from the first shank 448. The rear shank 450 is sized to be slideably received within the handle bore 426. Multiple spaced apart flat surfaces 452 are formed on the rear shank 450 and provide possible seating surfaces for the set screw 428 so that the handle 420 may be secured in assembly with the cutter bit 422 in multiple possible angular positions relative to the cutter bit 422. A coaxial bore is formed by a bore wall 454 in the cutter bit 422 and opens outwardly through the forward end 310 of the cutter bit 422 and preferably extends throughout the entire length of the cutter bit 422, opening outwardly through the rear end 311 of the rear shank 450. The bore wall 454, and hence the bore, has a diameter at least equal to the diameter of the cylindrical central conductor 230, but preferably the bore diameter is slightly larger than the diameter of the central conductor 230.

The cutter bit 422 has a forwardly converging conical chamfer 456 formed on the forward end 310 of the coring portion 444 and formed less than one full convolution of the coring portion 444. The axis of the conical chamfer 456 is preferably coincident with the axis of the stepped cylindrical cutter bit 422. A spiral relief channel 458 formed in the coring portion 444 is defined by opposing channel side walls 460 and 462 and a radially outwardly facing inner wall opens radially outwardly through the cylindrical outer peripheral surface of the coring portion 444 and through the forward end 310 of the coring portion 444. A first cutting edge 464 is formed at the forward end 310 of the cutter bit 422 by an intersection of the spiral channel side walls 460 and 462 and extends outwardly from the bore wall 454 to a termination point 466 at the chamfer 456. The termination point 466 is spaced from the central axis of the cutter bit 422 a distance preferably less than the radial axial dimension of the coring portion 444.

The first cutting edge 464 is preferably skewed at a compound angle relative to the axis of the cutter bit 422. More preferably, the first cutting edge 464 is skewed relative to an axial plane of the cutter bit 422 passing throughout the termination point 466. The first cutting edge 464 is also preferably skewed relative to a radial line extending from the axis of the cutter bit 422 and passing through the termination point 466. The first cutting edge 464 is preferably skewed at a compound angle relative to the axis of the cutter bit 422. The first cutting edge 464 preferably does not lie within either an axial or a radial plane of the cutter bit 422.

The coring portion 444 preferably has a second cutting edge or skiving edge 472 located near the forward end 310 of the spiral relief channel 458 and formed by the intersection of the relief channel inner wall and the bore wall 454, as it forms an opening in the bore wall 454 near the forward end 310 of the cutter bit 422. The skiving edge 472 is preferably a rectilinear edge disposed in generally parallel relation to the axis of the cutter bit 422 and preferably angularly spaced about the axis of the cutter bit 422 from the first cutting edge 464. The skiving edge 472 cuts the material of the dielectric core 232 as the cutter bit 422 advances into the outer conductor 234 during the cable coring process. The inside diameter of the bore wall 454 is preferably slightly larger than the outside diameter of the central conductor 230, so that the skiving edge 472 does not directly engage the outer surface of the central conductor 230. The skiving edge 472 engages the material of the dielectric core 232 in close proximity to the outer surface of the central conductor 230, reducing the likelihood of damage to the cylindrical outer surface of the central conductor 230, while tearing and breaking the remaining thin layer of dielectric material free from the outer surface of the central conductor 230.

The illustrated cutter bit 422 further includes a third cutting or stripping edge 484 formed on the stripping portion 446. The stripping portion 446 has a generally radially disposed, forwardly facing helical surface 478. The helical surface 478 has a forwardly open groove 479 with a V-shaped cross-section formed therein. A spiral relief channel, formed in the stripping portion 446 and partially defined by a side wall, intersects the helical surface 478 to define the third cutting or stripping edge 484, which has a generally V-shape. The stripping edge 484 is axially spaced from the first cutting edge 464 and the skiving edge 472 and is adapted to engage the free edge of the outer conductor 234 and cut away a portion of the outer conductor 234 to expose a longer length of the central conductor 230, so that the central conductor 230 extends for some distance beyond the end of the outer conductor 234.

Figure 5:
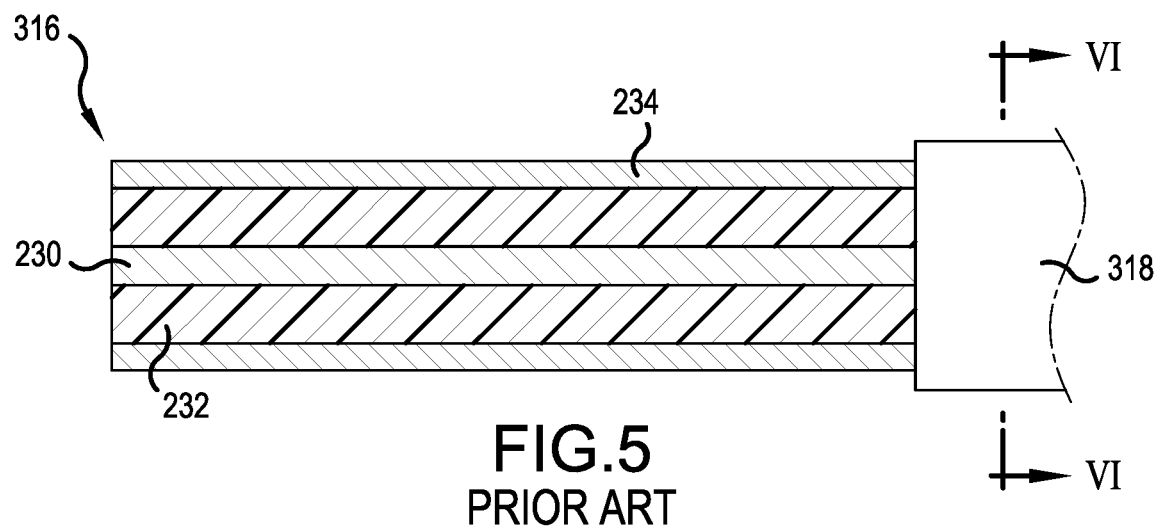
FIG. 5 is side view in partial cross-section showing an intermediate step in the preparation of the end of the coaxial cable of FIG. 2.
Figure 6:
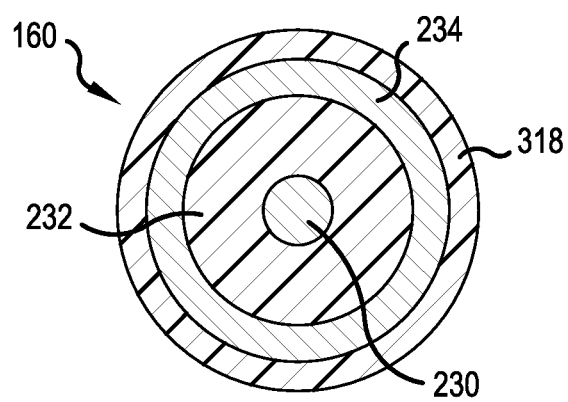
FIG. 6 is a cross-sectional view taken along line VI-VI in FIGS. 4 and 5.

To prepare an end of a coaxial cable 160 for termination to a connector 210, an end of the coaxial cable 160 is cut flush. A stripper tool may be used to remove a section of the jacket 318 and expose a section of the outer conductor 234, as shown in FIG. 5. The end faces of the central conductor 230, the dielectric core 232 and the outer conductor 234 lie generally within a common radial plane of the coaxial cable 160. The cut end portion of the coaxial cable 160 is inserted into the alignment bushing 438 through the bore 442 which coaxially aligns the end of the coaxial cable 160 with the forward end 310 of the cutter bit 422. The coaxial cable 160 is pushed into the bore 442 until the forward end 310 of the cutter bit 422 is then brought into a face-to-face contacting relation with the cut end of the coaxial cable 160, after which the coring tool 410 is manually rotated. The cutting bit 422 will engage the material of the dielectric core 232 while light pressure is manually applied to the tool in the direction of the coaxial cable 160 to cause the first cutting edge 464 to engage and cut the material of the dielectric core 232.

The chamfer 456 at the forward end 310 of the cutting bit 422 enables the smooth entry of the cutter bit 422 within the outer conductor 234, as material of the dielectric core 232 is progressively removed by the first cutting edge 464. The compound angle of the first cutting edge 464 relative to the axis of the cutter bit 422 establishes substantially point contact between the advancing first cutting edge 464 and the material of the dielectric core 232 so that the cutting operation may progress in response to relatively light rotational pressure applied to the tool holder 420. The chamfer 456 further assures accurate coaxial alignment between the cutter bit 422 and the outer conductor 234 as the cutter bit 422 initially advances into the outer conductor 234.

Since the termination point 466 of the first cutting edge 464 is spaced slightly inwardly from the inner surface the outer conductor 234, the risk of scoring or gouging the interior surface of the outer conductor 234 is substantially reduced. During the coring operation, the skiving edge 472 engages and cuts or skives the material of the dielectric core 232 to separate the material of the dielectric core 232 from the central conductor 230 to which it may be bonded.

Figure 3:
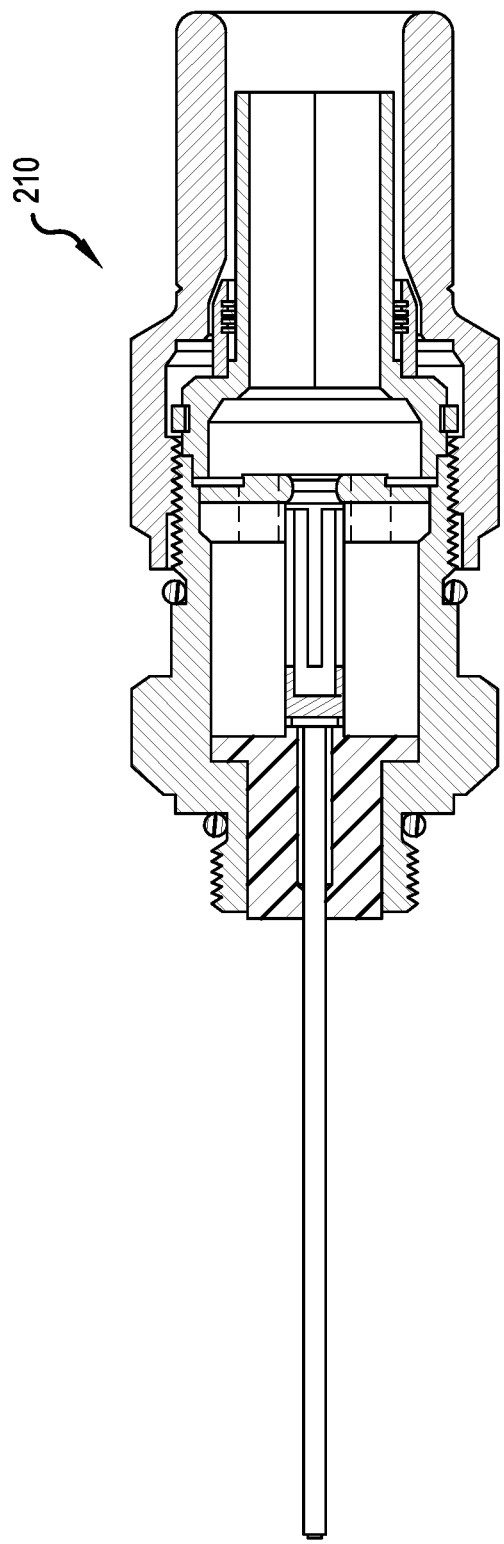
FIG. 3 illustrate a connector for attachment to the cable end of FIG. 2, in accordance with the prior art.
Figure 4:
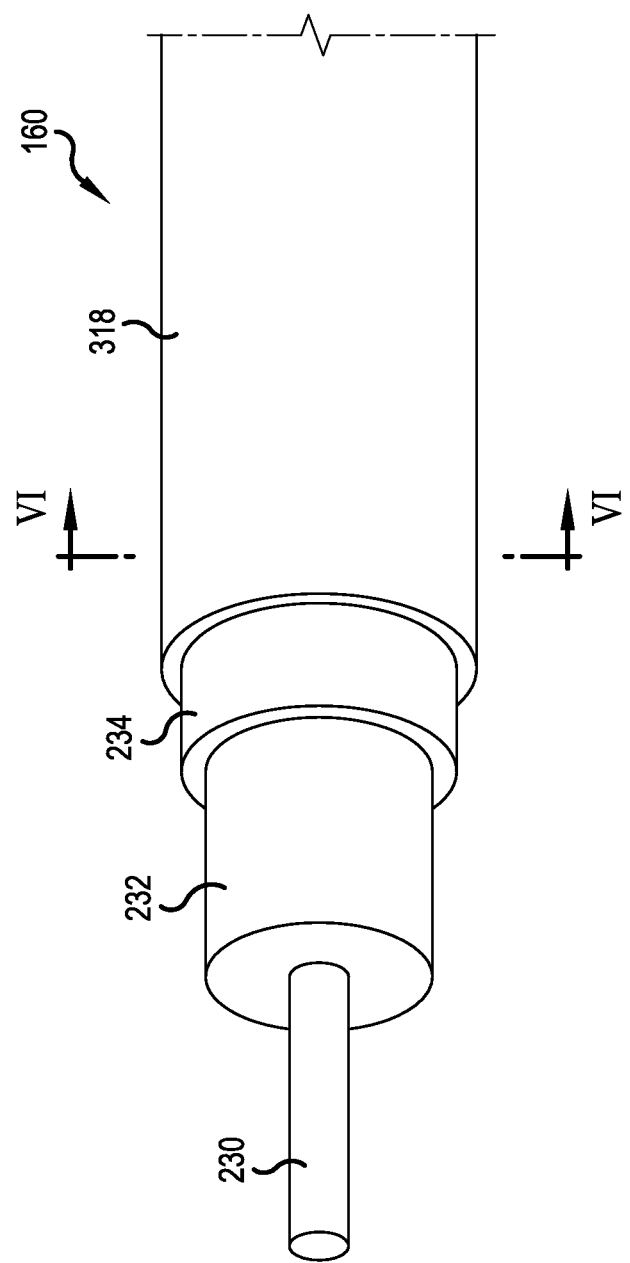
FIG. 4 is a perspective view showing the component parts of the coaxial cable, in accordance with the prior art.

When the stripping edge 484 engages the outer conductor 234, further rotation of the coring tool 410 relative to the outer conductor 234 progressively cuts or peels away an end edge of the outer conductor 234 thereby exposing the central conductor 230 beyond the cut end portion of the outer conductor 234, e.g., producing a stinger. The V-shaped configuration of the stripping edge 484 produces slight chamfers on the cut edge of the outer conductor 234. This arrangement of the stripping edge 484 reduces the likelihood of requiring a deburring operation on the outer conductor 234 prior to insertion into the connector 210 of FIG. 3.

Figure 2:
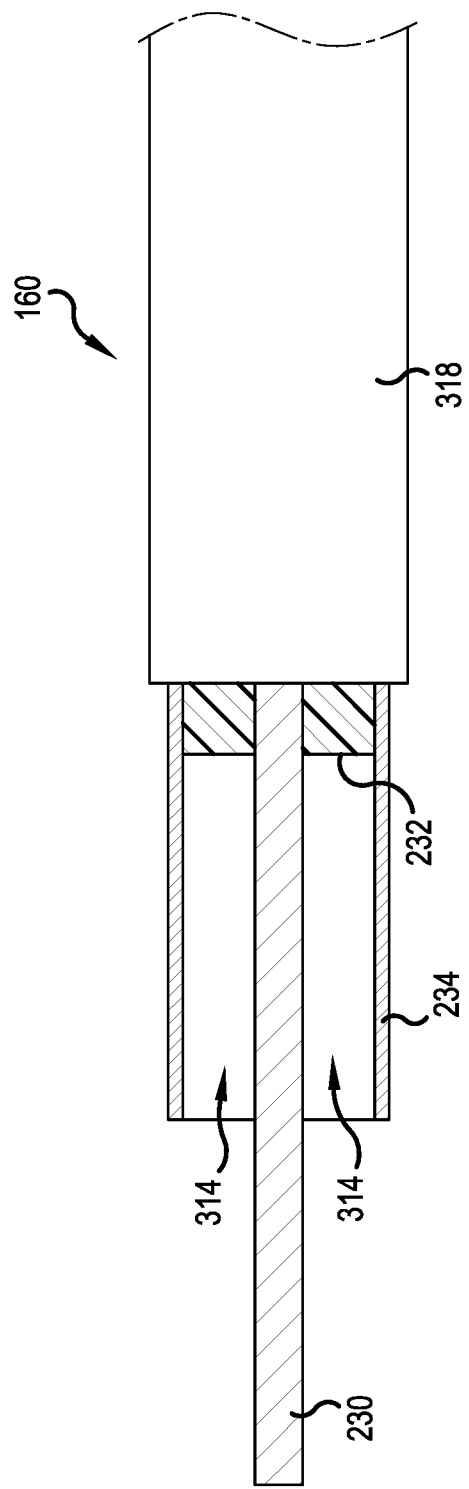
FIG. 2 illustrates an end of a coaxial cable that has been cored in a manner suitable to terminate it to a connector, in accordance with the prior art.

If the dielectric core 232 is not bonded to either the outer conductor 234 or the central conductor 230, the coring operation performed by the coring tool 410 on the cable 160 will substantially remove a section the dielectric core 232, exposing the finishes on both the outer surface the central conductor 230 and the inner surface of the outer conductor 234, leaving the end portion of the cable 160 substantially as it appears in FIG. 2. If the dielectric core 232 is bonded to either the outer conductor 234 and/or the central conductor 230, a secondary operation may be used to further remove remaining material adhered to the cylindrical outer surface of the central conductor 230 and/or the inner surface of the outer conductor 234 after the coring operation has been performed to arrive at the end portion of the cable 160 depicted in FIG. 2.

For durability, it is advantageous to produce the first cutting edge 464, skiving edge 472 and stripping edge 484 of a metal or alloy. Forming any of the cutting edges 464, 472 and/or 484 of plastic would result in the cutting edges 464, 472 and/or 484 quickly dulling. A dull cutting edge 464, 472 and/or 484 makes it more difficult to manually turn the coring tool 410 during the cable coring process. However, if the entire cutter bit 422 is formed of a metal or alloy, the likelihood exists that exposed outer surfaces of the central conductor 230 will be electrically connected, e.g., shorted, to exposed inner surfaces of the outer conductor 234. As the stripping edge 484 peels off the edge of the outer conductor 234, the cutter bit 422 has a constant electrical connection to the outer conductor 234. If the skiving edge 472 makes electrical contact to the central conductor 230 or if an exposed section of the central conductor 230 makes electrical contact with the bore wall 454, an intermittent shorting event will occur during the contact. To this end, the present invention contemplates forming the cutter bit 422 of at least two materials wherein one of the materials is a non-conductive material.

In a first embodiment, the cutter bit 422 of FIGS. 7-10 is formed of a first material, which is an electrically conductive metal or alloy. The first material is very durable so that the cutter bit 422 will enjoy a long service life. A second non-conductive material is coated over a surface of the cutter bit 422. The non-conductive material may take the form of a ceramic layer or second part, which may be bonded to an exterior surface of the first material or first part, e.g., by a baking process.

The coating may exist only on an exterior of the bore wall 454 facing to the central conductor 230 of the coaxial cable 160. By this arrangement, the section of the central conductor 230 within the bore wall 454 is insulated from other portions of the cutter bit 422 and exposed portions of the central conductor 230 within the bore wall 454 will not be able to create a shorting event. The skiving edge 472 would still potentially make intermittent contact with the central conductor 230, as the skiving edge 472 removes material of the dielectric core 232 from the outer surface of the central conductor 230. However, exposed sections of the central conductor 230 would soon move into contact with the non-conductive coating on the bore wall 454. As such, the electrical shorting event should be more intermittent, e.g., of a shorter duration as compared to the prior art device, and hence less likely to cause a reset event in the power supply of the optical nodes 140 and/or the RF amplifiers 170.

It would also be possible to apply the non-conductive coating over an entirety of said cutter bit 422. In this manner, the exterior of the coring portion 444, which may bear against the inner surface of the outer conductor 234 of the coaxial cable 160, will have a non-conductive coating. The cutting edges 464, 472 and/or 484 would also have a non-conductive coating, e.g., a ceramic coating. Even if the coating were to partially wear off of the conductive first material at the cutting edges 464, 472 and/or 484 during continual use, the presence of the remaining portions of the non-conductive coating would still serve to reduce the duration of shorting events and hence reduce the likelihood of a reset event at the power supply in the optical nodes 140 and/or RF amplifiers 170.

Figure 11:
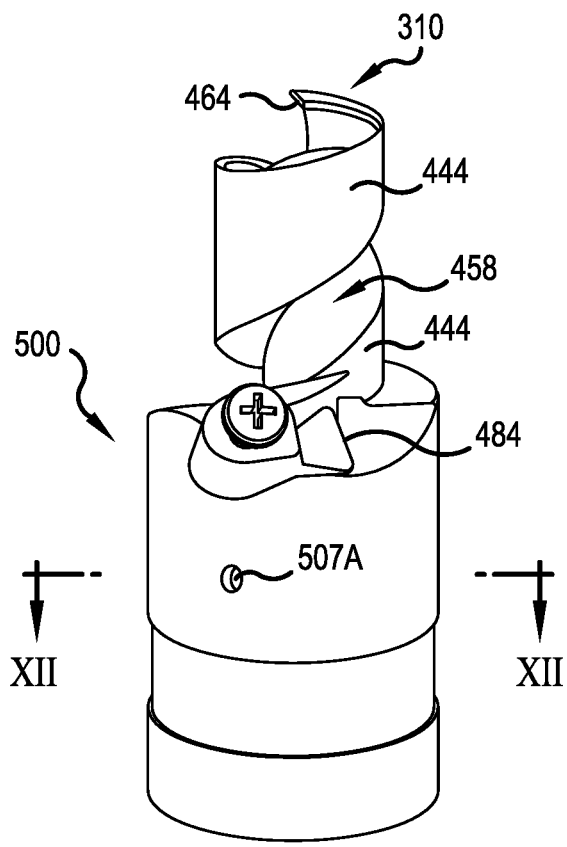
FIG. 11 is a perspective view a first alternative cutter bit.
Figure 12:
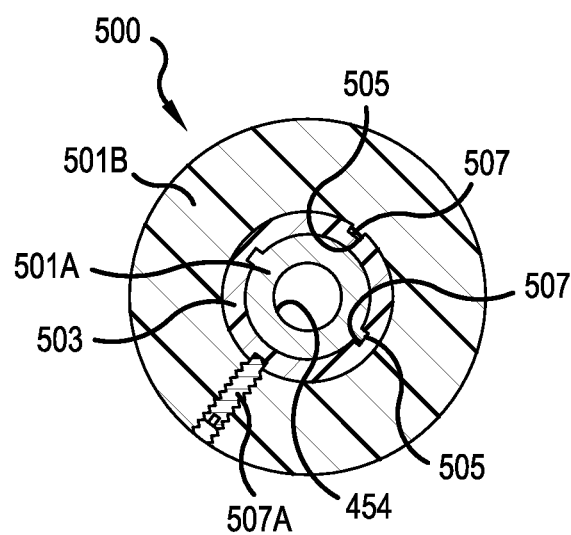
FIG. 12 is a cross-sectional view taken along line XII-XII in FIG. 11.

In a second embodiment, the cutter bit 422 of FIGS. 7-10 is replaced with the cutter bit 500 of FIGS. 11 and 12. FIG. 11 is a perspective view of the second embodiment of the cutter bit 500, and FIG. 12 is a cross-sectional view taken along line XII-XII in FIG. 11. The cutter bit 500 has a modified outer shape to illustrate that the cutter bit 500 of the present invention may be modified in shape, while still including the benefits of the present invention. The tool holder 420 can be modified to accept the newly-shaped, cutter bit 500. However, it should be understood that the exterior dimensions and shapes of the cutter bit 500 in the second embodiment may be made identical to the cutter bit 422 of FIGS. 7-10, so that no modification would be needed to the tool holder 420.

The cutter bit 500 is constructed of at least first and second parts 501 and 503, which are connected together. The first part 501 is formed of an electrically conductive metal or alloy. The second part 503 is formed of a non-conductive material, e.g., a dielectric plastic material. As best seen in FIG. 12, the second part 503 is a tubular sleeve. The first part 501 includes an inner tubular member 501A within the tubular sleeve, forming the bore wall 454 and also includes an outer member 501B, constituting the remaining portions of the cutter bit 500.

Optionally, the second part 503, i.e., the tubular sleeve, is separable and replaceable relative to the first part 501, or first parts 501A and 501B. For example, the first part 501 includes one of a first projection or a first recess to receive a second projection. The second part 503 includes one of a second recess to receive the first projection of the first part 501 or the second projection to engage the first recess of the first part 501. In the example of FIG. 12, the second part 503 includes recesses 505 and the first part 501A/501B includes projections 507 to engage the recesses 505. The recesses 505 and projections 507 could allow for a snap-fit between the first and second parts 501A/501B and 503. The second part 503, which is formed of a plastic, may be slightly deformed to allow the projections 507 of the first part 501A/501B to laterally slide across the second part 503 into engagement positions and snap into the recesses 505 of the second part 503.

If a more secure connection between the first part 501A/501B and the second part 503 is desired, one of the projections 507 may be formed as a set screw 507A. The set screw 507A is removably threaded into the first part 501B. A tip end of the set screw 507A engages into one of the recesses 505 formed in the second part 503 when the set screw 507A is screwed into, and fully seated into, the first part 501B. All of the engagements between the first part 501A/501B and the second part 503 may be made by one or more set screws 507A. If so, when the set screws 507A are loosened, the first part 501A/501B and the second part 503 may be separated, so that a worn part may be replaced.

As depicted in FIG. 12, the second part 503 is formed as a dielectric layer existing between the bore wall 454 and the stripping edge 484. The stripping edge 484 progressively peels off the outer conductor 234 of the coaxial cable 160, as the coring tool 410 is rotated and is thereby in solid electrical contact with the outer conductor 234. The second part 503 electrically isolates the stripping edge 484 from the bore wall 454, which can potentially make electrical contact with the central conductor 230 of the coaxial cable 160.

In a more preferred embodiment, the second part 503 is formed as a dielectric layer existing between the bore wall 454 and the cylindrical coring portion 444. Even if the outer surface of the coring portion 444 makes intermittent electrical contact with the inner surface of the outer conductor 234 of the coaxial cable 160, the second part 503 will insulate the coring portion 444 from the bore wall 454. In this position the stripping edge 484 is also insulated from the bore wall 454 because the stripping edge 484 is radially outward of the coring portion 444.

Figure 13:
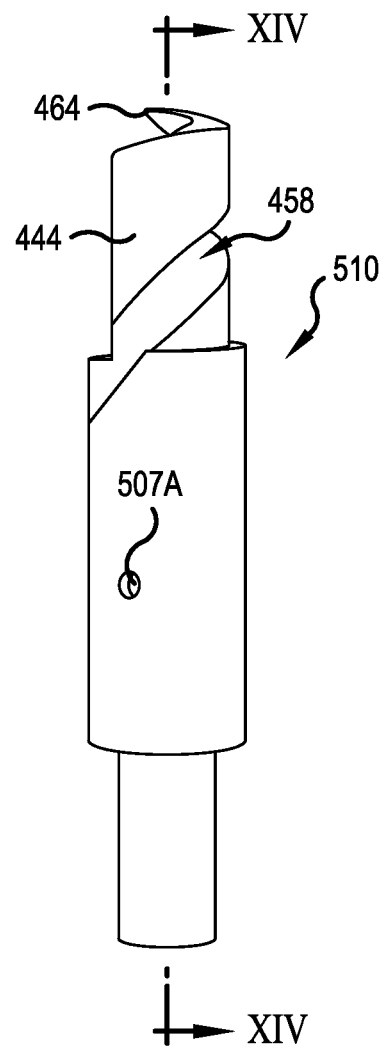
FIG. 13 is a perspective view of a second alternative cutter bit.
Figure 14:
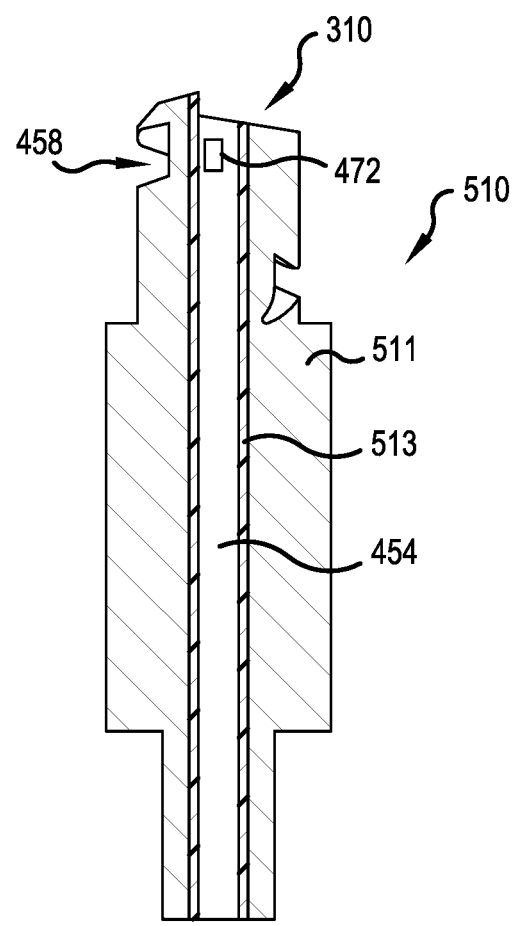
FIG. 14 is a cross-sectional view taken along line XIV-XIV in FIG. 13.

In a third embodiment, the cutter bit 422 of FIGS. 7-10 is replaced with the cutter bit 510 of FIGS. 13 and 14. FIG. 13 is a perspective view of the third embodiment of the cutter bit 510, and FIG. 14 is a cross-sectional view taken along line XIV-XIV in FIG. 13. The cutter bit 510 has the second part 513 formed as a dielectric, tubular sleeve, which serves as the bore wall 454. The first part 511 is the entirety of the remaining portions of the cutter bit 510. The second part 513 may be secured to the first part 511 using the projection 507 and recesses 505, as depicted in FIG. 12, or by one or more set screws 507A threaded into the first part 511 to engage recesses 505 in the second part 513.

A method of making a cable coring tool 410 includes forming an axially elongated cutter bit 422, 500, 510 out of a first part 501/511 and a second part 503/513, wherein the first part 501/511 is electrically conductive and the second part 502/513 is nonconductive. The method further includes attaching the cutter bit 422, 500, 510 to a tool holder 420 so that the cutter bit 422, 500, 510 projects axially outwardly from the tool holder 420. The cutter bit 422, 500, 510 has a forward end 310 and a coaxial cylindrical bore defined by a bore wall 454. The bore opens through the forward end 310 and is configured to receive an end portion of the central conductor 230 of the coaxial cable 160 therein. The cutter bit 422, 500, 510 has a generally cylindrical coring portion 444 proximate the forward end 310. The coring portion 444 has an outside diameter approximately equal to an inside diameter of the outer conductor 234 of the coaxial cable 160.

To form the cutter bit 422, 500, 510 in a first embodiment, the method includes attaching the second part 503, 513 to the first part 501, 511 by engagements of projections 507, 507A and recesses 505 formed on the first and second parts 501, 511, 503, 513. In this embodiment, one or more of the projections 507, 507A may be formed as a set screw 507A and the method may include tightening a set screw 507A, which is threaded into the first part 501 or 511 and engaging a tip end of the set screw 507A to the second part 503 or 513. To form the cutter bit 422 in a second embodiment, the method includes coating the second part as a layer, e.g., a ceramic layer, onto the first part.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

We claim:

1. A coring tool for coring a coaxial cable having an axially extending cylindrical central conductor, a generally cylindrical dielectric core coaxially surrounding the central conductor, and a generally cylindrical tubular outer conductor coaxially surrounding the dielectric core, said coring tool comprising:
   a tool holder; and
   an axially elongated cutter bit mounted to and projecting axially outwardly from said tool holder;
   wherein said cutter bit has a forward end and a coaxial cylindrical bore defined by a bore wall, with said bore opening through said forward end, said bore configured to receive an end portion of the central conductor therein, said bore having a diameter greater than the diameter of the central conductor, said cutter bit having a generally cylindrical coring portion proximate said forward end for rotatably drilling out and removing the generally cylindrical dielectric core surrounding the central conductor of the coaxial cable, said coring portion having an outside diameter approximately equal to an inside diameter of the outer conductor; and
   wherein said coring portion of said cutter bit is constructed of at least first and second parts which are connected together, said first part being formed of an electrically conductive metal or alloy, and said second part being formed of a non-conductive material.

2. The coring tool according to claim 1, wherein said second part is a tubular sleeve forming said bore wall.

3. The coring tool according to claim 2, wherein said first part is the entirety of the remaining portions of said cutter bit.

4. The coring tool according to claim 1, wherein said second part is a sleeve and said first part includes an inner tubular member within said sleeve forming said bore wall and also includes an outer member constituting the remaining portions of said cutter bit.

5. The coring tool according to claim 1, wherein said second part is separable and replaceable from said first part.

6. The coring tool according to claim 1, wherein said first part includes one of a first projection or a first recess to receive a second projection, and said second part includes one of a second recess to receive said first projection of said first part or said second projection to engage said first recess of said first part.

7. The coring tool according to claim 1, wherein said second part includes a recess and said first part includes a projection to engage said recess.

8. The coring tool according to claim 7, wherein said projection is a set screw removably threaded into said first part which engages into said recess formed in said second part when said set screw is fully seated into said first part.

9. The coring tool according to claim 1, wherein said cutter bit includes a stripping edge, and wherein rotation of said cutter bit causes said stripping edge to progressively peel off an edge of the outer conductor of the coaxial cable to expose more of the inner conductor.

10. The coring tool according to claim 9, wherein said second part is a layer existing between said bore wall and said stripping edge.

11. The coring tool according to claim 10, wherein said second part is a layer existing between said bore wall and said cylindrical coring portion.

12. A coring tool for coring a coaxial cable having an axially extending cylindrical central conductor, a generally cylindrical dielectric core coaxially surrounding the central conductor, and a generally cylindrical tubular outer conductor coaxially surrounding the dielectric core, said coring tool comprising:

a tool holder; and an axially elongated cutter bit mounted to and projecting axially outwardly from said tool holder;

wherein said cutter bit has a forward end and a coaxial cylindrical bore defined by a bore wall, with said bore opening through said forward end, said bore configured to receive an end portion of the central conductor therein, said bore having a diameter greater than the diameter of the central conductor, said cutter bit having a generally cylindrical coring portion proximate said forward end for rotatably drilling out and removing the generally cylindrical dielectric core surrounding the central conductor of the coaxial cable, said coring portion having an outside diameter approximately equal to an inside diameter of the outer conductor; and wherein said coring portion of said cutter bit is constructed of an electrically conductive metal or alloy as a first part with a non-conductive coating as a second part bonded to an exterior surface of said conductive metal or alloy.

13. The coring tool according to claim 12, wherein said coating exists on an exterior of said bore wall facing to the central conductor of the coaxial cable.

14. The coring tool according to claim 12, wherein said coating exists over an entirety of said cutter bit.

15. The coring tool according to claim 12, wherein said coating is ceramic.

16. The coring tool according to claim 15, wherein said ceramic is baked onto all of the exterior surfaces of said cutter bit.

17. A method of making a cable coring tool for coring a coaxial cable having an axially extending cylindrical central conductor, a generally cylindrical dielectric core coaxially surrounding the central conductor, and a generally cylindrical tubular outer conductor coaxially surrounding the dielectric core, said method comprising:

providing a tool holder;

forming an axially elongated cutter bit out of a first part and a second part, wherein the first part is electrically conductive and the second part is nonconductive; and attaching the cutter bit to the tool holder so that the cutter bit projects axially outwardly from the tool holder, wherein the cutter bit has a forward end and a coaxial cylindrical bore defined by a bore wall, with the bore opening through the forward end, the bore configured to receive an end portion of the central conductor therein, the bore having a diameter greater than the diameter of the central conductor, the cutter bit having a generally cylindrical coring portion proximate the forward end for rotatably drilling out and removing the generally cylindrical dielectric core surrounding the central conductor of the coaxial cable, the coring portion having an outside diameter approximately equal to an inside diameter of the outer conductor, and wherein the coring portion is formed of the first and second parts.

18. The method of claim 17, wherein forming the cutter bit includes:

attaching the second part to the first part by engagements of projections and recesses formed on the first and second parts.

19. The method of claim 17, wherein forming the cutter bit includes:

coating the second part onto the first part.

20. The method of claim 17, wherein forming the cutter bit includes:

tightening a set screw which is threaded into the first part and engaging the set screw to the second part.

* * * * *